(12) United States Patent
Li et al.

(10) Patent No.: US 12,429,912 B2
(45) Date of Patent: Sep. 30, 2025

(54) COMPUTING DEVICE DOCKING STATION

(71) Applicant: Future Dial, Inc., Sunnyvale, CA (US)

(72) Inventors: Jisheng Li, Los Altos, CA (US); George Huang, Los Altos Hills, CA (US); Yueting Zhang, San Jose, CA (US); Haofeng Song, Santa Clara, CA (US)

(73) Assignee: Future Dial, Inc., Sunnyvale, CA (US)

( * ) Notice: Subject to any disclaimer, the term of this patent is extended or adjusted under 35 U.S.C. 154(b) by 226 days.

(21) Appl. No.: 17/075,595

(22) Filed: Oct. 20, 2020

(65) Prior Publication Data

US 2022/0121241 A1 Apr. 21, 2022

(51) Int. Cl.
| | | |
|---|---|---|
| *G06F 1/16* | (2006.01) | |
| *G08B 5/36* | (2006.01) | |
| *H02J 50/12* | (2016.01) | |
| *H02J 50/40* | (2016.01) | |

(52) U.S. Cl.
CPC ............. *G06F 1/1632* (2013.01); *G08B 5/36* (2013.01); *H02J 50/12* (2016.02); *H02J 50/402* (2020.01)

(58) Field of Classification Search
CPC .......... G06F 1/1632; G08B 5/36; H02J 50/12; H02J 50/402
See application file for complete search history.

(56) References Cited

U.S. PATENT DOCUMENTS

| | | | | |
|---|---|---|---|---|
| 5,841,424 A | * | 11/1998 | Kikinis | G06F 3/023 345/156 |
| 8,243,455 B1 | * | 8/2012 | Raymond | G06F 1/1632 361/679.41 |
| 9,104,373 B1 | * | 8/2015 | Lechman | G06F 1/1632 |
| 2003/0110333 A1 | * | 6/2003 | Fuchida | G06F 1/1632 710/72 |
| 2005/0070156 A1 | * | 3/2005 | Behl | G06F 1/183 439/541.5 |
| 2007/0049071 A1 | * | 3/2007 | Jackson | G06F 1/1632 439/79 |
| 2008/0165066 A1 | * | 7/2008 | Tiscareno | H01Q 1/242 343/702 |
| 2008/0278894 A1 | * | 11/2008 | Chen | G06F 1/1632 361/679.01 |
| 2011/0193524 A1 | * | 8/2011 | Hazzard | H02J 7/0013 320/114 |

(Continued)

*Primary Examiner* — Jacob R Crum
(74) *Attorney, Agent, or Firm* — Greenberg Traurig

(57) ABSTRACT

A device includes a housing comprising a device surface and an input/output surface. The housing includes a plurality of docking bays arrayed in a row adjacent to each other. Each of the plurality of docking bays include an input/output interface, the interface configured to receive a wired connection from a device to be investigated; a button on the input/output surface; and a light on the input/output surface, the light configured to communicate a status of the respective docking bay. An input/output port is connected to the interface of each of the plurality of docking bays and configured to connect the devices to be investigated with a computing system via a single connection. A power input is configured to receive a power supply, the power input electrically connected to the light in each of the plurality of docking bays. Wiring for the plurality of docking bays is disposed within the housing.

15 Claims, 4 Drawing Sheets

(56) References Cited

U.S. PATENT DOCUMENTS

| | | | |
|---|---|---|---|
| 2013/0225096 A1* | 8/2013 | Elter | H04M 1/04 455/74.1 |
| 2014/0361995 A1* | 12/2014 | Halim | G06F 3/0488 345/173 |
| 2015/0046622 A1* | 2/2015 | Ramirez | G06F 1/1632 710/303 |

* cited by examiner

COMPUTING DEVICE DOCKING STATION

FIELD OF THE TECHNOLOGY

At least some embodiments disclosed herein relate generally to computing devices. More particularly, the embodiments relate to devices and systems for operating on computing devices.

BACKGROUND

Large volumes of computing devices (e.g., mobile devices, such as cellular telephones, tablets, etc.) are recycled and often refurbished. There are numerous aspects to the refurbishing process. One aspect includes receiving, testing, and/or resetting the computing device to its original factory settings. Some of these devices are then refurbished and can be resold to new users.

The refurbishing process requires multiple steps including a lot of manual interaction, which is both error-prone and expensive.

SUMMARY

In an embodiment, a device includes a housing comprising a device surface and an input/output surface. The housing includes a plurality of docking bays arrayed in a row adjacent to each other. Each of the plurality of docking bays include an input/output interface, the interface configured to receive a wired connection from a device to be investigated; a button on the input/output surface; and a light on the input/output surface, the light configured to communicate a status of the respective docking bay. An input/output port is connected to the interface of each of the plurality of docking bays and configured to connect the devices to be investigated with a computing system via a single connection. A power input is configured to receive a power supply, the power input electrically connected to the light in each of the plurality of docking bays. Wiring for the plurality of docking bays is disposed within the housing.

In an embodiment, a system includes a computing system including a processor and a memory and a docking station connected in communication with the computing system. The docking station includes a housing comprising a device surface and an input/output surface. The housing includes a plurality of docking bays arrayed in a row adjacent to each other. Each of the plurality of docking bays include an input/output interface, the interface configured to receive a wired connection from a device to be investigated; a button on the input/output surface; and a light on the input/output surface, the light configured to communicate a status of the respective docking bay. An input/output port is connected to the interface of each of the plurality of docking bays and configured to connect the devices to be investigated with a computing system via a single connection. A power input is configured to receive a power supply, the power input electrically connected to the light in each of the plurality of docking bays. Wiring for the plurality of docking bays is disposed within the housing.

In an embodiment, the system includes a docking station array including a plurality of docking stations.

In an embodiment, the system includes a hub connected to the computing system via a single connection and a plurality of connections to connect to the plurality of docking stations.

BRIEF DESCRIPTION OF THE DRAWINGS

References are made to the accompanying drawings that form a part of this disclosure and illustrate embodiments in which systems and methods described in this Specification can be practiced.

Like reference numbers represent like parts throughout.

DETAILED DESCRIPTION

In general, there are many human errors during fabricating or refurbishing of computing devices such as, but not limited to, smartphones, tablets, and the like. These errors may result in a significant financial loss and slowdown of the fabricating or refurbishing processes. To avoid these errors and improve production efficiency and accuracy, a docking station is described that provides additional interaction and instructions between an operator and a computing system. In use, the operators follow instructions from the computing system and indications of what to do based on a series of lighting outputs and inputs from the operator.

Embodiments are described below that describe the devices, systems, and methods herein relative to a refurbishing process. The scope of the application is not intended to be limited to just refurbishing. It is to be appreciated that this is an example, and that the devices, systems, and methods herein can be useful in a manufacturing/fabricating and initial setup of computing devices as well.

Figure 1:
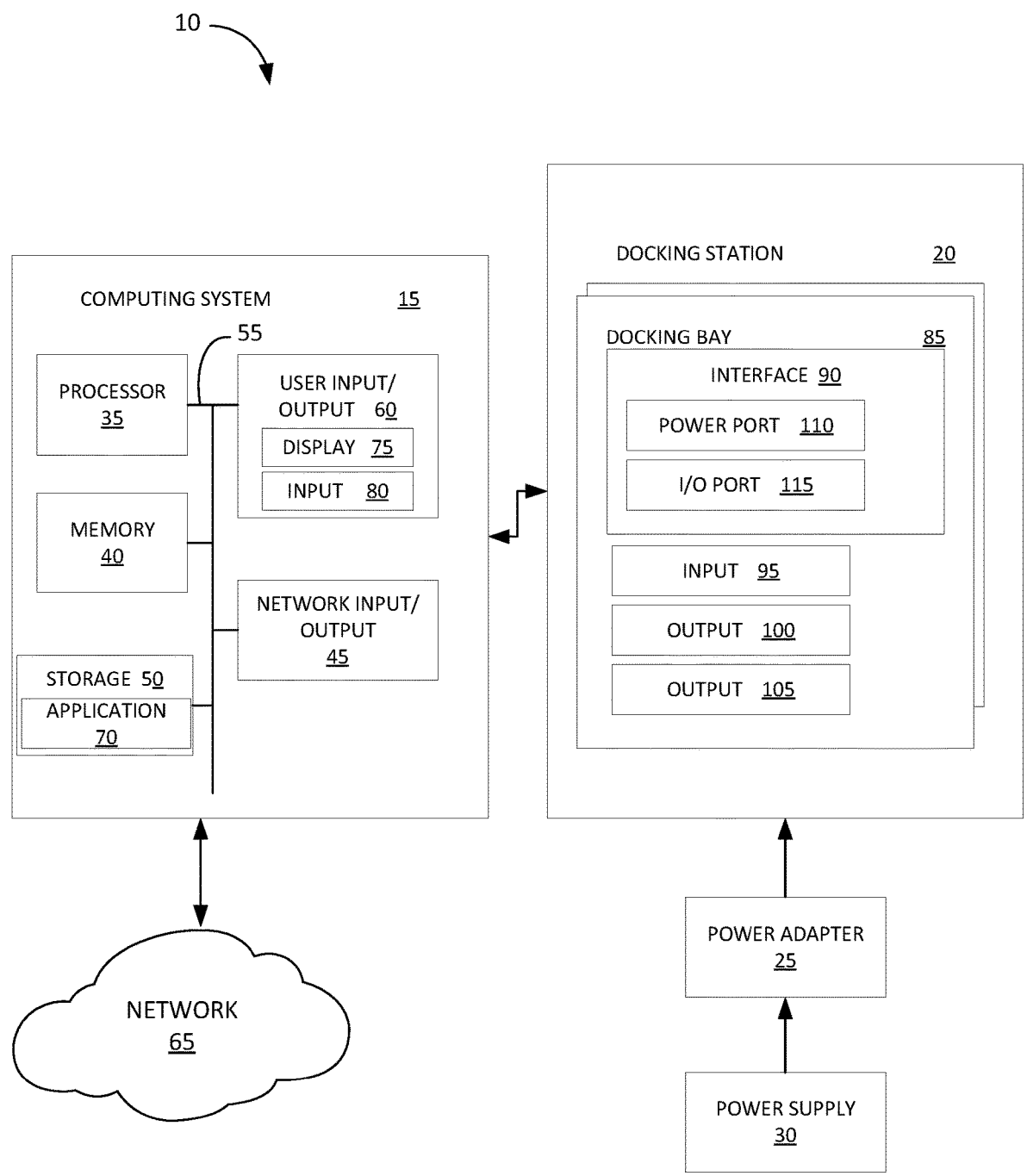
FIG. 1 shows a system, according to an embodiment.

FIG. 1 shows a system 10, according to an embodiment. The system 10 can generally be used to investigate, receive, or otherwise operate on a plurality of computing devices. In an embodiment, investigating includes testing. Examples of investigating or otherwise operating on the plurality of computing devices can include, for example, data removal, device testing, or device inspection. Types of tests can include, for example, functional tests for the device under investigation. These types of tests and investigations can be useful in the process of refurbishing computing devices.

The system 10 includes a computing system 15, a docking station 20, a power adapter 25, and a power supply 30.

The computing system 15 is configured to run various operations on one or more computing devices under investigation that are placed on the docking station 20. The computing system 15 can alternatively be referred to as the system 15. The computing system 15 includes a processor 35, a memory 40, a network input/output 45, a storage 50, an interconnect 55, and a user input/output 60. The computing system 15 can be in communication with one or more additional computing systems 15 through a network 65.

The processor 35 can retrieve and execute programming instructions that are stored in the memory 40, the storage 50, or combinations of the memory 40 and the storage 50. For example, the storage 50 can include an application 70. The application 70 can, when executed, cause the processor 35 to perform a method to remove all data from the device under investigation and return the device under investigation to its factory settings. In an embodiment, the application 70 can, when executed, cause the processor 35 to perform a method to test a functionality of the device under investigation. The processor 35 can also store and retrieve application data residing in the memory 40. The interconnect 55 transmits programming instructions, application data, or combinations thereof, between the processor 35, the user I/O 60, the memory 40, the storage 50, and the network I/O 45. The interconnect 55 can be one or more busses or the like. The processor 35 can be a single processor, multiple processors, or a single processor having multiple processing cores. In an embodiment, the processor 35 is a single-threaded processor. In an embodiment, the processor 35 is a multi-threaded processor.

The user I/O 60 includes a display 75 and an input 80. In an embodiment, the display 75 and the input 80 are combined (e.g., a touchscreen interface). In an embodiment, the input 80 can include a variety of input devices suitable for receiving an input from the user. Examples of suitable devices include, but are not limited to, keyboard, a voice command, a proximity sensor, an ocular sensing device for determining an input based on eye movements (e.g., scrolling based on an eye movement), or the like. The user can provide information about the devices under investigation to the computing system 15 via the input 80 and can receive instructions via the display 75. For example, the display 75 can display an instruction for an operator to take an action on one of the devices under investigation. In an embodiment, the display 75 could display a question to the operator such as, but not limited to, whether the device under investigation has any cracks or defects and the user can input a response via the input 80.

The memory 40 is generally included to be representative of a random access memory (RAM) such as, but not limited to, Static Random Access Memory (SRAM), Dynamic Random Access Memory (DRAM), or Flash. In some embodiments, the memory 40 can be a volatile memory. In some embodiments, the memory 40 can be a non-volatile memory. In some embodiments, at least a portion of the memory can be virtual memory.

The storage 50 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. The storage 50 can be a computer readable medium. In an embodiment, the storage 50 can include storage that is external to the computer device 10, such as in a cloud.

The network I/O 45 is configured to transmit data via the network 65. The network 65 may be referred to as the communications network 65. Examples of the network 65 include, but are not limited to, a local area network (LAN), a wide area network (WAN), the Internet, or the like. The network I/O 45 can transmit data via the network 65 through a wireless connection using Wi-Fi, Bluetooth, or other similar wireless communication protocols. The computer system 15 can transmit data via the network 65 through a cellular, 3G, 4G, 5G, or other wireless protocol.

The docking station 20 includes a plurality of docking bays 85 arranged in a row adjacent to each other. The plurality of docking bays 85 each include an interface 90 for a wired connection to enable electronic communication between a device under investigation and the computing system 15. In an embodiment, the device under investigation could communicate wirelessly with the computing system 15. The interface 90 can be, for example, a universal serial bus (USB) connector or the like. The plurality of docking bays 85 each include an input 95 and outputs 100, 105.

The interface 90 can include a power port 110 and a communications input/output port 115 such as, but not limited to, a USB port. In an embodiment, because USB ports are capable of providing power, the power port 110 may not be included. In an embodiment, instead of the power port 110, the docking bays 85 can include a wireless charging capability such that when the device under investigation is placed into the docking bay 85, the device under investigation is charged.

The input 95 can typically be a button configured to provide an input to the computing system 15 when pressed. As used herein, a button is not intended to require a particular structure. A button 95 is provided such that, when activated by an operator, a signal is provided to the computing system 15. In an embodiment, the button 95 can be physically pressed by the operator, while in other embodiments, proximity of the operator's finger can activate the button. The output 100 can be a status indicator such as, but not limited to, a light emitting diode (LED). The output 105 can be a light such as, but not limited to, a light strip such as an LED strip. The outputs 100, 105 can be configured to output different colors of light according to an operator's needs. Generally, different light colors can be selected to indicate a message such as, but not limited to, "action needed," "error," "process complete," or the like.

The power adapter 25 can be connected to the power supply 30 to provide power to the docking station 20. In an embodiment, the power supply 30 can be an alternating current (AC) power source and the power adapter 25 can convert the AC power from the power supply 30 to direct current (DC) and provide to the docking station 20 (e.g., for powering the lights, etc.). The power can ultimately be supplied to the devices under investigation. In an embodiment, the plurality of docking bays 85 can include a wireless charger connected to the power supply 30 via the power adapter 25.

The illustrated embodiment includes a single docking station 20. It is to be appreciated that this is an example and that additional docking stations 20 can be included. Such an array of docking stations 20 is shown and described in additional detail in accordance with FIGS. 3-4 below.

Figure 2:
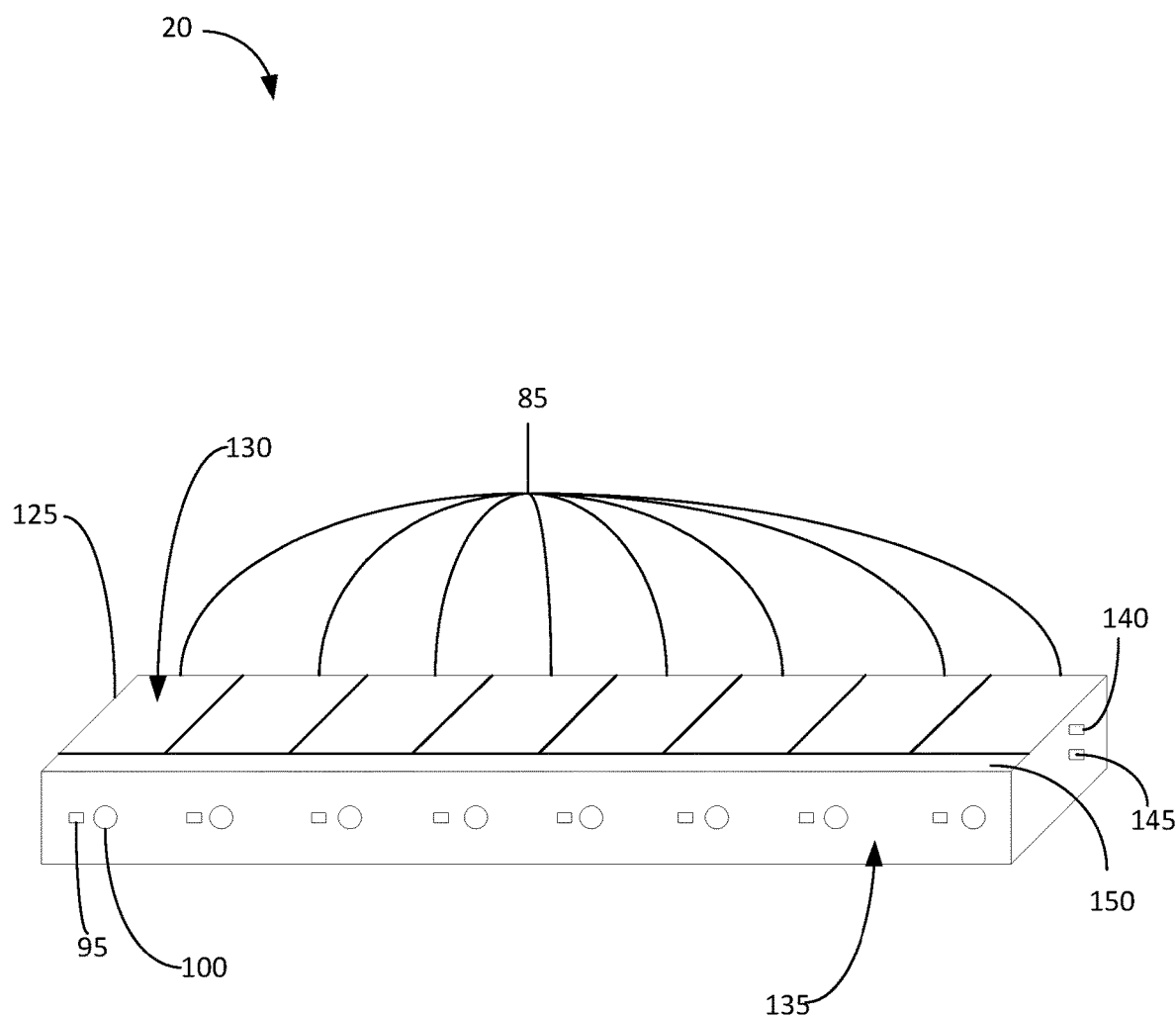
FIG. 2 shows the docking station of FIG. 1, according to an embodiment.

FIG. 2 shows the docking station 20 of FIG. 1, according to an embodiment.

In the illustrated embodiment, the docking station 20 includes eight docking bays 85. It is to be appreciated that the number of docking bays 85 is an example, and that the number of docking bays 85 can vary beyond eight. For example, there can be fewer or greater than eight docking bays 85, according to an embodiment. A size of the docking bays 85 can vary according to a type of the devices to be investigated. For example, if the devices to be investigated are smartphones, then a size to accommodate a typical smartphone may be selected for the docking bays 85. Alternatively, when the devices to be investigated are tablets, then a size to accommodate a typical tablet may be selected for the docking bays 85. In an embodiment, the type of devices to be investigated can dictate the number of docking bays 85. For example, the docking station 20 can include eight docking bays 85 when the devices to be investigated are smartphones, but could accommodate fewer than eight docking bays 85 when the devices to be investigated are tablets. It is to be appreciated that computing devices other than smartphones and tablets can be accommodated by the docking station 20, but that smartphones and tablets may be the most common computing devices.

The docking station 20 includes a housing 125 including a device surface 130 and an input/output surface 135.

Generally, devices under investigation will be placed on the device surface 130 and the input 95 and output 100 will be placed on the input/output surface 135. The other output 105 may be visible on the device surface 130.

Within the housing 125, a hub can provide connections to the interfaces 90 for each of the bays 85. As a result, one interface 140 can be provided for the docking station 20 to connect to the computing system 15. Similarly, a power interface 145 can be provided which is wired to each of the bays 85 so that a single power connection can be made for the docking station 20. In an embodiment, the power interface 145 can provide power to the outputs 100, 105 but not the devices under investigation. In an embodiment, the power interface 145 can provide power to the outputs 100, 105 and the devices under investigation via a wireless charging functionality. By including the interface 140 with the hub and the power interface 145, a number of wires connecting the devices under investigation with the computing system 15 can be reduced.

The housing 125 can be, for example, placed on top of a workspace such as, but not limited to, a tabletop or the like.

In an embodiment, the housing 125 can include a lip or ledge 150 protruding from the device surface 130 disposed on an edge of the housing 125 (on the device surface 130) to prevent the device under investigation from easily sliding off the device surface 130.

Figure 3:
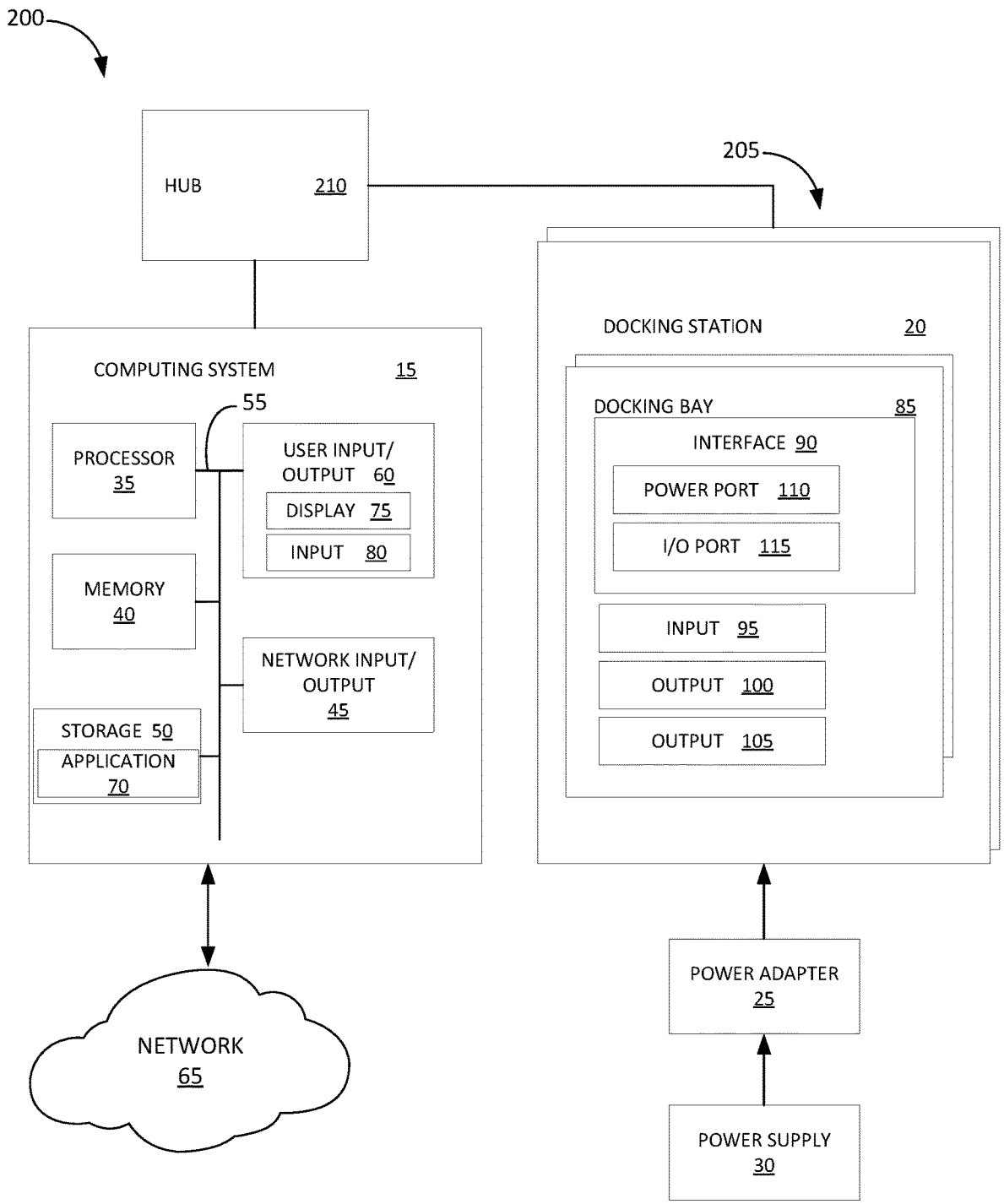
FIG. 3 shows show a system, according to an embodiment.

FIG. 3 shows show a system 200, according to an embodiment. The system 200 of FIG. 3 differs from the system 10 of FIG. 1 in the number of docking stations 20 that are included in the system 200. That is, the system 200 includes a docking station array 205 having a plurality of docking stations 20. For the simplicity of this Specification, other features of the system 200 that are the same as those described in the system 10 of FIG. 1 will not be again described in further detail.

A hub 210 is connected to the computing system 15 and the docking station array 205. The hub 210 receives a single connection from the computing system 15 and can be connected to each docking station 20 within the docking station array 205. As a result, a number of wires connecting the docking stations 20 in the docking station array 205 can be reduced.

It is to be appreciated that the number of docking stations 20 can vary.

Figure 4:
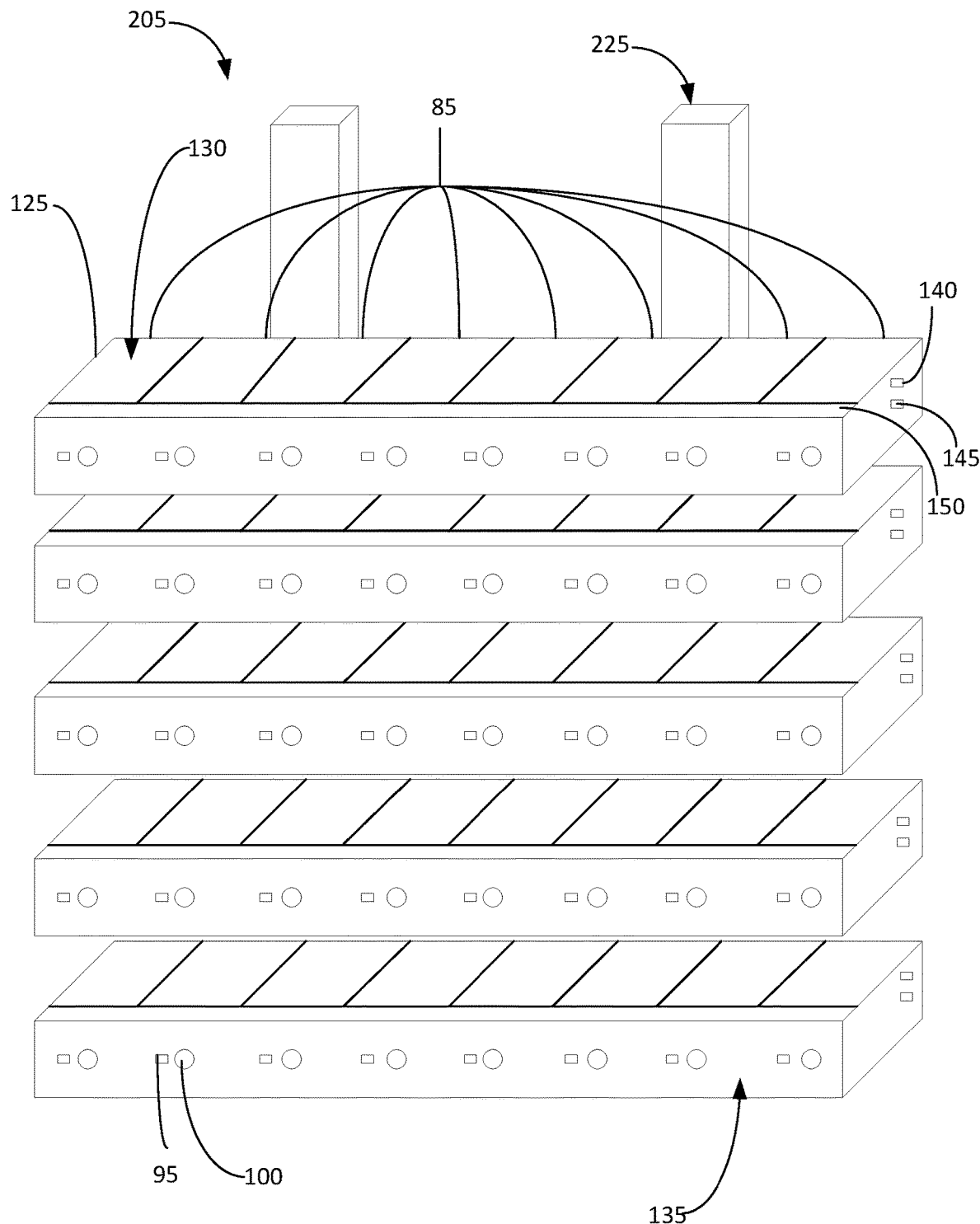
FIG. 4 shows the docking station array of FIG. 3, according to an embodiment.

FIG. 4 shows the docking station array 205 of FIG. 3, according to an embodiment. The docking station array 205 includes the plurality of docking stations 20 connected to a stand 225. The stand 225 can support the plurality of docking stations 20 spaced apart from one another such that an operator can insert and remove devices under investigation from each of the plurality of docking stations 20. In the illustrated embodiment the plurality of docking stations 20 are the same. In an embodiment, the docking station array 205 could include docking stations 20 that are different from each other. For example, the docking stations 20 could include a different number of docking bays 85, docking bays 85 configured for receiving different types of devices, or the like. Although it may be possible to connect more than one docking station array 205 to a single computing system 15 (FIG. 3), it may not be beneficial as with too many devices being managed by a single computing system 15, a bottleneck could form.

The docking station 20 and docking station array 205 can advantageously increase throughput when refurbishing computing devices. Additionally, the interactions (inputs and outputs) with the operator can reduce a number of errors by a user during the refurbishing.

The illustrated docking station array 205 includes five docking stations 20. It is to be appreciated that this is an example and the actual number of docking stations 20 can be greater than or less than five.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, operations, elements, and/or components, but do not preclude the presence or addition of one or more other features, integers, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device, comprising:
 a housing comprising:
  a device surface configured to receive a device and an input/output surface,
   wherein the input/output surface is oriented perpendicular to the device surface;
  the housing including a plurality of docking bays arrayed in a row adjacent to each other,
   each of the plurality of docking bays comprising:
    a first interface, the first interface configured to receive a wired connection from a device to be investigated;
    a button on the input/output surface;
    a light on the input/output surface, the light configured to communicate a status of the respective docking bay, wherein different colors of light are used to indicate different statuses for the respective docking bay, wherein the statuses include action needed, error, or process complete;
    wherein the button and the light are arranged to be aligned with a location of the respective docking bay;

a second interface configured to connect the devices to be investigated to a computing system;

a power interface configured to receive a power supply, the power interface electrically connected to the light in each of the plurality of docking bays, the power interface being separate from the second interface; and wherein each first interface is configured to be connected to the second interface;

wherein the second interface is configured to connect the devices to be investigated with the computing system via a single connection;

wherein wiring for the plurality of docking bays is disposed within the housing.

2. The device of claim 1, wherein the plurality of docking bays each comprise a wireless charging station.

3. The device of claim 1, wherein the plurality of docking bays are separated by a visual indicator to delineate the plurality of docking bays from each other.

4. The device of claim 1, comprising a second light for each of the plurality of docking bays disposed within the housing.

5. A system, comprising:
a computing system comprising a processor and a memory; and
a docking station connected in communication with the computing system, comprising:
  a housing comprising a device surface configured to receive a device and an input/output surface, the housing including a plurality of docking bays arrayed in a row adjacent to each other,
    wherein the input/output surface is oriented perpendicular to the device surface;
  each of the plurality of docking bays comprising:
    a first interface, the first interface configured to receive a wired connection from a device to be investigated;
    a button on the input/output surface;
    a light on the input/output surface, the light configured to output a plurality of different colors, each of the plurality of different colors configured to communicate a different status of the respective docking bay, wherein the statuses include action needed, error, or process complete;
    wherein the button and the light are arranged to be aligned with a location of the respective docking bay;

a second interface configured to connect the devices to be investigated to the computing system;

a power interface configured to receive a power supply, the power interface electrically connected to the light in each of the plurality of docking bays, the power interface being separate from the second interface; and a hub configured to connect each first interface to the second interface;

wherein the second interface is configured to connect the devices to be investigated with the computing system via a single connection;

wherein wiring for the plurality of docking bays is disposed within the housing.

6. The system of claim 5, comprising a plurality of docking stations connected in communication with the computing system.

7. The system of claim 6, comprising a hub connected between the computing system and the plurality of docking stations, the hub configured to receive a single connection from the computing system and provide a connection for each of the plurality of docking stations.

8. The system of claim 6, wherein each of the plurality of docking stations comprise a power interface, the system comprising a power adapter connected to the power interface of each of the plurality of docking stations and configured to be connected to a single power source.

9. The system of claim 6, wherein the plurality of docking stations are the same.

10. The system of claim 6, wherein the plurality of docking bays each comprise a wireless charging station.

11. The system of claim 6, wherein the plurality of docking bays are separated by a visual indicator to delineate the plurality of docking bays from each other.

12. The system of claim 6, comprising a second light for each of the plurality of docking bays disposed within the housing.

13. The system of claim 6, comprising a stand, wherein the plurality of docking stations are arranged in a vertically stacked configuration and connected to the stand.

14. The system of claim 13, wherein the plurality of docking stations are a single unit when connected to the stand.

15. The system of claim 6, further comprising a lip disposed on the device surface and between the device surface and the input/output surface.

* * * * *